(12) United States Patent
Pean

(10) Patent No.: US 12,270,682 B2
(45) Date of Patent: Apr. 8, 2025

(54) DEVICE FOR WARNING ABOUT THE ABSENCE OF BELAYING OF A CLIMBER

(71) Applicant: MASAI, Grenoble (FR)

(72) Inventor: Philippe Pean, Eybens (FR)

(73) Assignee: MASAI, Grenoble (FR)

( * ) Notice: Subject to any disclaimer, the term of this patent is extended or adjusted under 35 U.S.C. 154(b) by 419 days.

(21) Appl. No.: 17/726,005

(22) Filed: Apr. 21, 2022

(65) Prior Publication Data
US 2023/0341225 A1    Oct. 26, 2023

(51) Int. Cl.
*G01C 5/06* (2006.01)
*A62B 35/00* (2006.01)
*A63B 29/02* (2006.01)

(52) U.S. Cl.
CPC ............ *G01C 5/06* (2013.01); *A62B 35/0043* (2013.01); *A62B 35/0093* (2013.01); *A63B 29/02* (2013.01); *A63B 2220/10* (2013.01); *A63B 2220/18* (2013.01); *A63B 2225/74* (2020.08)

(58) Field of Classification Search
None
See application file for complete search history.

(56) References Cited

U.S. PATENT DOCUMENTS

| 2018/0207455 A1 | 7/2018 | Thompson | |
|---|---|---|---|
| 2020/0282244 A1* | 9/2020 | Livreau | G01L 5/047 |

FOREIGN PATENT DOCUMENTS

| DE | 102016101532 A1 | 8/2017 |
|---|---|---|
| FR | 3102065 A1 | 4/2021 |
| JP | 2017-093515 A | 6/2017 |

OTHER PUBLICATIONS

European Search Report and Opinion for European Application No. 20202687.8, dated Feb. 11, 2021, 14 pages with English translation.
French Search Report and Opinion for French Application No. 1911754, dated Jun. 9, 2020, 24 pages with English translation.

* cited by examiner

*Primary Examiner* — Daniel S Larkin
(74) *Attorney, Agent, or Firm* — TraskBritt

(57) ABSTRACT

A device for warning about the absence of belaying of a climber includes an enclosure intended to be fastened to a harness. A pressure sensor is designed to measure a barometric pressure. A detector, intended to be fastened to a link, is configured to detect a movement of the link within a range of positive inclines with respect to a horizontal reference plane. The detector is also configured to output a detection signal comprising a first state, indicating that the link is within the range of positive inclines, and a second state, indicating that the link is outside the range of positive inclines. A microprocessor is configured to compute a variation in the barometric pressure measured by the pressure sensor, and send a warning signal as soon as the variation in the barometric pressure exceeds a predetermined threshold and the detection signal is in the second state.

13 Claims, 2 Drawing Sheets

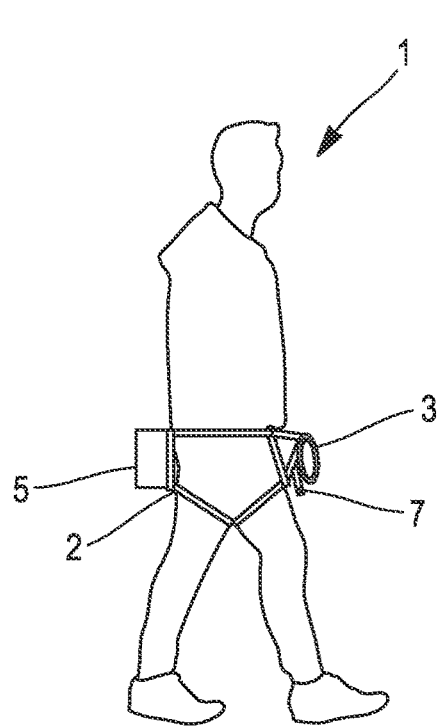
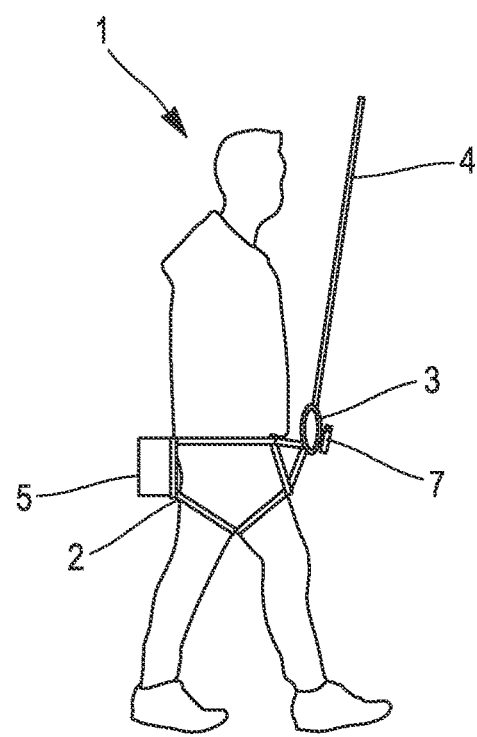
FIG. 3A  FIG. 3B
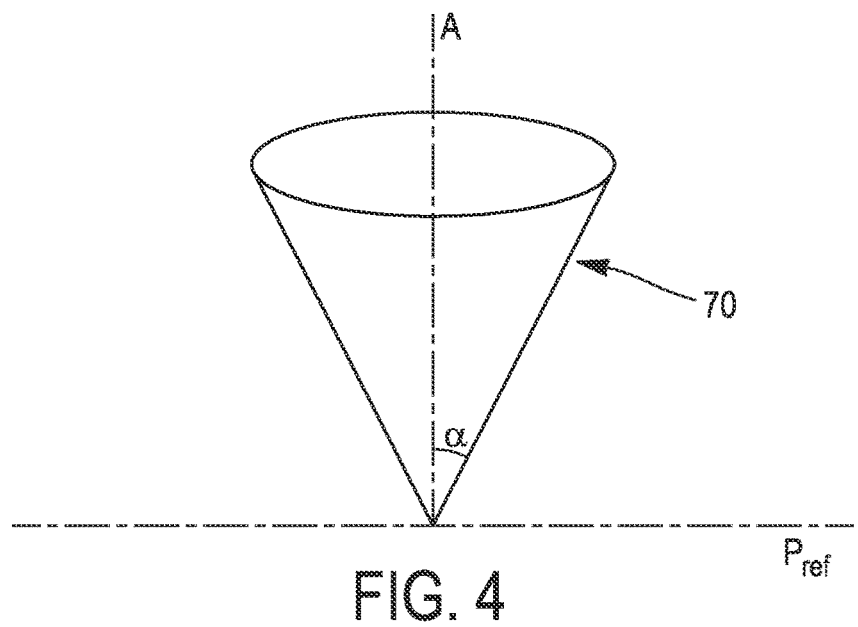
FIG. 4

DEVICE FOR WARNING ABOUT THE ABSENCE OF BELAYING OF A CLIMBER

CROSS-REFERENCE TO RELATED APPLICATION

The subject matter of this application is related to French Patent Application Serial No. 1911754, filed Oct. 21, 2019.

TECHNICAL FIELD

The disclosure relates to the technical field of devices for warning about the absence of belaying of a climber equipped with a harness to which a link is attached, the link being intended to be held by a belaying system.

The disclosure is applicable in particular in the monitoring of a climbing hall and the safeguarding of climbers.

BACKGROUND

One device known from the prior art, in particular the product "Safe Gate" from Techtopia, comprises sensors arranged horizontally on the climbing wall three meters (3 m) above the ground. The sensors make it possible to detect the absence of belaying of the climber when said climber goes past the horizontal line formed by the sensors.

Such a device from the prior art is not fully satisfactory since it requires each climbing wall to be equipped with dedicated sensors, which may be expensive when it is desired to monitor a whole climbing hall.

BRIEF SUMMARY

Embodiments of the disclosure aim to completely or partially remedy the aforementioned drawbacks. To this end, one subject of the disclosure is a device for warning about the absence of belaying of a climber equipped with a harness to which a link is attached, the link being intended to be held by a belaying system with a final positive incline with respect to a horizontal reference plane, the device comprising:
- an enclosure, intended to be fastened to the harness;
- a pressure sensor, arranged in the enclosure to measure a barometric pressure;
- detection means, intended to be fastened to the link, and configured so as to detect a movement of the link within a range of positive inclines with respect to the horizontal reference plane, the final positive incline being contained within the range of positive inclines, the detection means being configured so as to output a detection signal comprising:
  - a first state, indicating that the link is within the range of positive inclines, and
  - a second state, indicating that the link is outside the range of positive inclines; and
- a microprocessor, arranged in the enclosure, connected to the pressure sensor and to the detection means, and configured so as to:
  - compute a variation in the barometric pressure measured by the pressure sensor, and
  - send a warning signal as soon as the variation in the barometric pressure exceeds a predetermined threshold and the detection signal is in the second state.

Such a device according to the disclosure thus makes it possible to warn about the absence of belaying of a climber by checking:
- the incline of the link (using the detection means), intended to be held by the belaying system, and
- the altitude of the climber (using the pressure sensor).

In the absence of belaying, the link is not held by the belaying system and therefore has a negative incline with respect to the horizontal reference plane. In the case of belaying, the link is held by the belaying system and has a positive incline with respect to the horizontal reference plane.

The warning signal is sent when the climber exceeds a predetermined altitude, and when the link is outside the range of positive inclines, signifying the absence of belaying. In other words, a dual condition has to be met. The microprocessor is configured so as to send the warning signal if and only if the variation in barometric pressure exceeds the predetermined threshold and the detection signal is in the second state.

Such a device according to the disclosure is fitted to the climber, and not to the climbing wall as in the prior art, thereby making it possible to dispense with the costs of installing sensors on each climbing wall in the hall.

Definitions

An "incline" is understood to mean the dihedral angle formed between the plane in which the link extends and the horizontal reference plane. By convention, the incline is positive (respectively negative) when the link extends above (respectively below) the horizontal reference plane.

An "enclosure" is understood to mean an object delimiting a non-hermetically closed space. The enclosure has to allow the entry of ambient air so that the pressure sensor is able to measure the barometric pressure. By way of non-limiting examples, the enclosure may be a housing or a harness pocket.

"Barometric pressure" is understood to mean the pressure of the air entering the enclosure, exerted on the surface of the pressure sensor.

A "predetermined threshold" is understood to mean a value of the variation in barometric pressure corresponding to a variation in altitude of the climber beyond which it is dangerous for the climber not to be belayed, for example beyond two meters (2 m).

The device according to the disclosure may comprise one or more of the following features.

According to one feature of the disclosure, the detection means are configured so as to detect the movement of the link within a solid angle extending above the horizontal reference plane, about an axis defined by the final positive incline of the link.

A "solid angle" is understood to mean a value defining the portion of space delimited by the center of a sphere and part of the surface of the sphere (surface element denoted dS) using the ratio $dS/R^2$, where R is the radius of the sphere.

One advantage that is provided is thus that of being able to reliably detect the final positive incline of the link with a permitted tolerance in the event of unintentional movement of the link.

According to one feature of the disclosure, the final positive incline of the link is vertical, and the axis is the normal to the horizontal reference plane.

According to one feature of the disclosure, the solid angle delimits a cone having a vertex half-angle of between 35° and 55°, preferably between 40° and 50°, more preferably equal to 45°.

One advantage that is provided is thus that of being able to reliably detect the final positive incline of the link with a reasonable permitted tolerance in the event of unintentional movement of the link.

According to one feature of the disclosure, the solid angle has an axis of revolution about the axis defined by the final positive incline of the link.

One advantage that is provided is thus that of being able to reliably detect the final positive incline of the link with a permitted tolerance all about its axis.

According to one feature of the disclosure, the detection means comprise an incline sensor, preferably a ball sensor.

One advantage that is provided is thus ease of implementation.

According to one feature of the disclosure, the microprocessor is configured so as to compute the variation in barometric pressure at a frequency greater than or equal to 2 Hz.

One advantage that is provided is thus that of being able to reliably and sufficiently quickly determine the exceedance of the predetermined threshold for the variation in barometric pressure in order to avoid the altitude of the climber being too high when the warning signal is sent.

According to one feature of the disclosure, the device comprises light-emitting and/or sound-emitting warning means, configured so as to be activated when the microprocessor sends the warning signal.

One advantage that is provided is thus the effectiveness of the warning, both for the climber and for a supervisor of the climbing hall.

According to one feature of the disclosure, the predetermined threshold for the variation in barometric pressure corresponds to a variation in altitude of the climber of between 2 m and 2.5 m.

One advantage that is provided is thus that of reducing the risks for the climber when the warning signal is sent.

According to one feature of the disclosure, the pressure sensor has a sensitivity greater than or equal to 1 mbar.

One advantage that is provided is thus that of being able to determine a corresponding variation in altitude of the climber with sufficient precision.

Another subject of the disclosure is an assembly for warning about the absence of belaying of a climber, comprising:
- a harness, intended to be fitted to the climber;
- a link, attached to the harness, and intended to be held by a belaying system with a final positive incline with respect to a horizontal reference plane; and
- a device according to the disclosure, the enclosure being fastened to the harness, the detection means being fastened to the link.

Another subject of the disclosure is a method for warning about the absence of belaying of a climber equipped with a harness to which a link is attached, the link being intended to be held by a belaying system with a final positive incline with respect to a horizontal reference plane, the method comprising the following steps:
a) providing an enclosure, intended to be fastened to the harness;
b) arranging a pressure sensor in the enclosure to measure a barometric pressure;
c) providing detection means, intended to be fastened to the link;
d) configuring the detection means so as to:
   detect a movement of the link within a range of positive inclines with respect to the horizontal reference plane, the final positive incline being contained within the range of positive inclines; and
   output a detection signal comprising:
      a first state, indicating that the link is within the range of positive inclines, and
      a second state, indicating that the link is outside the range of positive inclines;
e) arranging a microprocessor in the enclosure, said microprocessor being connected to the pressure sensor and to the detection means; and
f) configuring the microprocessor so as to:
   compute a variation in the barometric pressure measured by the pressure sensor, and
   send a warning signal as soon as the variation in the barometric pressure exceeds a predetermined threshold and the detection signal is in the second state.

BRIEF DESCRIPTION OF THE DRAWINGS

Other features and advantages will become apparent from the detailed description of various embodiments of the disclosure, the description containing examples and references to the appended drawings.

FIG. 3A is a perspective schematic view of a climber equipped with an assembly according to the disclosure, the link not being held by a belaying system. FIG. 3B is a perspective schematic view of a climber equipped with an assembly according to the disclosure, the link being held by a belaying system. The assembly according to the disclosure illustrated in FIG. 3B is not strictly identical to the assembly according to the disclosure illustrated in FIG. 3A. Specifically, FIGS. 3A and 3B illustrate different areas for fastening the detection means to the link.

FIG. 4 is a schematic of a solid angle of the detection means for detecting the movement of the link extending above a horizontal reference plane, about an axis defined by the final positive incline of the link.

DETAILED DESCRIPTION

Figure 1:
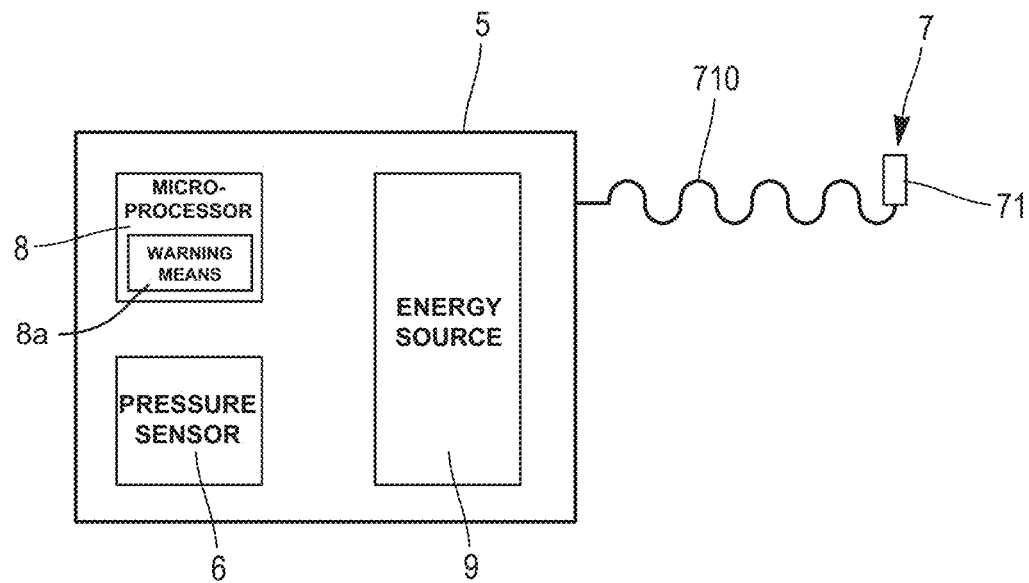
FIG. 1 is a sectional partial schematic view of a device according to the disclosure, the link not being illustrated.

For the sake of simplicity, elements that are identical or that perform the same function in the various embodiments have been designated with the same references.

One subject of the disclosure is a device for warning about the absence of belaying of a climber 1 equipped with a harness 2 to which a link 3 is attached, the link 3 being intended to be held by a belaying system 4 with a final positive incline with respect to a horizontal reference plane $P_{ref}$, the device comprising:
- an enclosure 5, intended to be fastened to the harness 2;
- a pressure sensor 6, arranged in the enclosure 5 to measure a barometric pressure;
- detection means 7, intended to be fastened to the link 3, and configured so as to detect a movement of the link 3 within a range of positive inclines with respect to the horizontal reference plane $P_{ref}$, the final positive incline being contained within the range of positive inclines, the detection means 7 being configured so as to output a detection signal comprising:

a first state, indicating that the link 3 is within the range of positive inclines, and a second state, indicating that the link 3 is outside the range of positive inclines; and a microprocessor 8, arranged in the enclosure 5, connected to the pressure sensor 6 and to the detection means 7, and configured so as to:

compute a variation in the barometric pressure measured by the pressure sensor 6, and send a warning signal as soon as the variation in the barometric pressure exceeds a predetermined threshold and the detection signal is in the second state.

The device may comprise the link 3, the detection means 7 being fastened to the link 3. The device is illustrated partially in FIG. 1.

Enclosure

The enclosure 5 may be implemented in the form of a housing. The housing may be made of a plastic material. According to one alternative, the enclosure 5 may be a harness pocket.

The enclosure 5 delimits a non-hermetically closed space in the sense that the enclosure 5 has to allow the entry of ambient air so that the pressure sensor 6 is able to measure the barometric pressure.

Pressure Sensor

The pressure sensor 6 advantageously has a sensitivity greater than or equal to 1 mbar.

By way of non-limiting examples, the pressure sensor 6 may be the BMP380 sensor from Bosch Sensortec, or else the MS5611-01BA03 sensor from MEAS Switzerland.

The device may comprise at least one pressure sensor 6, arranged in the enclosure 5 to measure a barometric pressure. In other words, the device may comprise an additional pressure sensor 6, arranged in the enclosure 5 to measure a barometric pressure. The additional pressure sensor 6 makes it possible, through redundancy, to improve the reliability of the barometric pressure measurement.

Detection Means

By way of non-limiting examples, the detection means 7 may be fastened to the link 3 by way of an adhesive, a strap (for example made of rubber), or a mounting bracket.

The detection means 7 are advantageously configured so as to detect the movement of the link 3 within a solid angle 70 extending above the horizontal reference plane $P_{ref}$, about an axis A defined by the final positive incline of the link 3. The final positive incline of the link 3 may be vertical, and the axis A about which the solid angle 70 extends is the normal to the horizontal reference plane $P_{ref}$. As illustrated in FIG. 4, the solid angle 70 advantageously delimits a cone having a vertex half-angle α of between 35° and 55°, preferably between 40° and 50°, more preferably equal to 45°. The solid angle 70 advantageously has an axis of revolution about the axis A defined by the final positive incline of the link 3.

Figure 2:
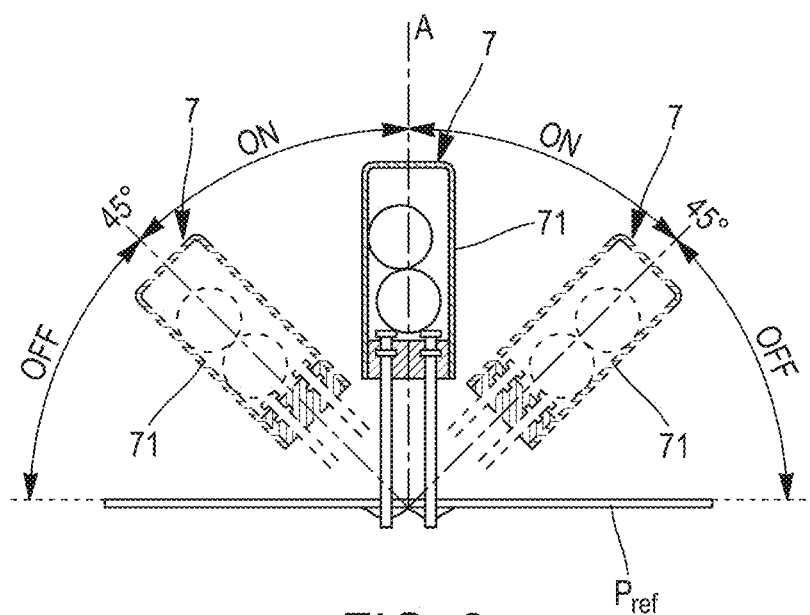
FIG. 2 is a sectional schematic view of detection means fitted to a device according to the disclosure. "ON" denotes the range of positive inclines detected by the detection means. "OFF" denotes the range of positive inclines not detected by the detection means. Negative inclines are not detected by the detection means.

As illustrated in FIG. 2, the detection means 7 advantageously comprise an incline sensor 71, preferably a ball sensor. As illustrated in FIG. 1, the incline sensor 71 is advantageously connected to the enclosure 5 by way of a preferably coiled cable 710.

The detection means 7 may comprise an incline sensor 71 fastened to the link 3. More precisely, the incline sensor 71 comprises a housing fastened to the link 3, for example by way of an adhesive, a strap (for example, made of rubber), or a mounting bracket.

The housing of the incline sensor 71 may be positioned (fixedly) on the link 3 such that the incline of the housing (with respect to the horizontal) as measured by the incline sensor 71 corresponds directly to the incline of the link 3 with respect to the horizontal reference plane $P_{ref}$. Thus, for example, the axis A about which the solid angle 70 extends may be normal to the horizontal reference plane $P_{ref}$. The fixed position of the housing of the incline sensor 71 on the link 3 may be chosen according to the geometry of the link 3. By way of non-limiting examples, the housing of the incline sensor 71 may be aligned with a longitudinal edge of the link 3; the housing of the incline sensor 71 and the link 3 may be coplanar.

According to one alternative, the housing of the incline sensor 71 may be positioned (fixedly) on the link 3 with a predetermined orientation with respect to the link 3, such that the incline of the link 3 with respect to the horizontal reference plane $P_{ref}$ may be measured based on the predetermined orientation and on the incline of the housing (with respect to the horizontal) as measured by the incline sensor 71. Thus, for example, the axis A about which the solid angle 70 extends may have an angle with the normal to the horizontal reference plane $P_{ref}$, the angle corresponding to said predetermined orientation of the housing of the incline sensor 71 with respect to the link 3. The fixed position of the housing of the incline sensor 71 on the link 3 may be chosen according to the geometry of the link 3.

Microprocessor and Warning Signal

The microprocessor 8 is advantageously configured so as to compute the variation in barometric pressure at a frequency greater than or equal to 2 Hz. The microprocessor 8 is advantageously configured so as to digitally filter the data provided by the pressure sensor 6. This digital filtering makes it possible to eliminate local and stray variabilities of the pressure measured by the pressure sensor 6.

The device advantageously comprises light-emitting and/or sound-emitting warning means 8a, configured so as to be activated when the microprocessor 8 sends the warning signal. The light-emitting warning means may be implemented in the form of light-emitting diodes. The warning signal may be sent to a server by way of a wireless transmission module in order to centralize the warnings and simplify the monitoring of a climbing hall.

The predetermined threshold for the variation in barometric pressure advantageously corresponds to a variation in altitude of the climber 1 of between 2 m and 2.5 m.

The microprocessor 8 is configured so as to send the warning signal if and only if the variation in the barometric pressure exceeds the predetermined threshold and the detection signal is in the second state.

Power Supply

The device may be supplied with electric power by an energy source 9. The energy source 9 may be cells or a battery. The energy source 9 is advantageously provided so that the device operates for one day without recharging.

Link and Belaying System

The term "link" is understood to mean a ring, preferably made of metal, possibly comprising an opening system. The ring has a closed curve that may have, for example, a circular, elliptic, triangular, etc. shape. The link 3 may be a carabiner attached directly to the harness 2. The belaying system 4 may comprise a rope attached to the carabiner by a knot (for example, a figure-of-eight knot or a fireman's chair knot).

The link 3 may be a quick-release link or a metal ring attached directly to the harness 2. The belaying system 4 may comprise:

a carabiner attached to the link 3, and a rope (or a strap) attached to the carabiner by a knot, the rope or the strap possibly belonging to an auto-belay device (for example, TRUBLUE®).

The link 3 may be a quick-release link or a metal ring attached directly to the harness 2. The belaying system 4 may comprise:

a fastening system (for example, "BelayMate" or "Safe Belay"), attached to the link 3, and an auto-belay device attached to the fastening system.

The link 3 is intended to be held by the belaying system 4 with a final positive incline with respect to a horizontal reference plane $P_{ref}$ when the belaying system 4 is operational.

One subject of the disclosure is a system for warning about the absence of belaying of a climber 1 equipped with a harness 2, the system comprising:

a belaying system 4; and a device according to the disclosure, the link 3 being mounted on the belaying system 4, the link 3 being intended to be held by the belaying system 4 with a final positive incline with respect to a horizontal reference plane $P_{ref}$.

Warning Assembly

Another subject of the disclosure is an assembly for warning about the absence of belaying of a climber 1, comprising:

a harness 2, intended to be fitted to the climber 1;

a link 3, attached to the harness 2, and intended to be held by a belaying system 4 with a final positive incline with respect to a horizontal reference plane $P_{ref}$, and a device according to the disclosure, the enclosure 5 being fastened to the harness 2, the detection means 7 being fastened to the link 3.

The assembly is illustrated in FIGS. 3A and 3B. The assembly according to the disclosure illustrated in FIG. 3B is not strictly identical to the assembly according to the disclosure illustrated in FIG. 3A. Specifically, FIGS. 3A and 3B illustrate different areas for fastening the detection means 7 to the link 3.

Warning Method

A final subject of the disclosure is a method for warning about the absence of belaying of a climber 1 equipped with a harness 2 to which a link 3 is attached, the link 3 being intended to be held by a belaying system 4 with a final positive incline with respect to a horizontal reference plane $P_{ref}$, the method comprising the following steps:

a) providing an enclosure 5, intended to be fastened to the harness 2;

b) arranging a pressure sensor 6 in the enclosure 5 to measure a barometric pressure;

c) providing detection means 7, intended to be fastened to the link 3;

d) configuring the detection means 7 so as to:

detect a movement of the link 3 within a range of positive inclines with respect to the horizontal reference plane $P_{ref}$, the final positive incline being contained within the range of positive inclines; and output a detection signal comprising:

a first state, indicating that the link 3 is within the range of positive inclines, and a second state, indicating that the link 3 is outside the range of positive inclines;

e) arranging a microprocessor 8 in the enclosure 5, said microprocessor being connected to the pressure sensor 6 and to the detection means 7; and f) configuring the microprocessor 8 so as to:

compute a variation in the barometric pressure measured by the pressure sensor 6, and send a warning signal as soon as the variation in the barometric pressure exceeds a predetermined threshold and the detection signal is in the second state.

Step c) may consist in fastening the detection means 7 to the link 3.

Step f) is carried out such that the microprocessor is configured so as to send the warning signal if and only if the variation in the barometric pressure exceeds the predetermined threshold and the detection signal is in the second state.

The disclosure is not limited to the disclosed embodiments. Anyone skilled in the art will be able to consider the technically workable combinations thereof, and to substitute equivalents therefor.

What is claimed is:

1. A device configured for warning about the absence of belaying of a climber equipped with a harness, the device comprising:

a link, configured to be attached to the harness, and configured to be held by a belaying system with a final positive incline with respect to a horizontal reference plane;

an enclosure, configured to be fastened to the harness;

a pressure sensor, arranged in the enclosure to measure a barometric pressure;

a detector, fastened to the link, and configured so as to detect a movement of the link within a range of positive inclines with respect to the horizontal reference plane, the final positive incline being contained within the range of positive inclines, the detector being configured so as to output a detection signal comprising:

a first state, indicating that the link is within the range of positive inclines, and a second state, indicating that the link is outside the range of positive inclines; and a microprocessor, arranged in the enclosure, connected to the pressure sensor and to the detector, and configured so as to:

compute a variation in the barometric pressure measured by the pressure sensor, and send a warning signal if and only if the variation in the barometric pressure exceeds a predetermined threshold and the detection signal is in the second state.

2. The device as claimed in claim 1, wherein the detector is configured so as to detect the movement of the link within a solid angle extending above the horizontal reference plane, about an axis defined by the final positive incline of the link.

3. The device as claimed in claim 2, wherein the final positive incline of the link is vertical, and the axis is the normal to the horizontal reference plane.

4. The device as claimed in claim 2, wherein the solid angle delimits a cone having a vertex half-angle of between 35° and 55°.

5. The device as claimed in claim 2, wherein the solid angle has an axis of revolution about the axis defined by the final positive incline of the link.

6. The device as claimed in claim 1, wherein the detector comprises an incline sensor.

7. The device as claimed in claim 1, wherein the microprocessor is configured so as to compute the variation in barometric pressure at a frequency greater than or equal to 2 Hz.

8. The device as claimed in claim 1, comprising light-emitting and/or sound-emitting warning means, configured so as to be activated when the microprocessor sends the warning signal.

9. The device as claimed in claim 1, wherein the predetermined threshold for the variation in barometric pressure corresponds to a variation in altitude of the climber of between 2 m and 2.5 m.

10. The device as claimed in claim 1, wherein the pressure sensor has a sensitivity greater than or equal to 1 mbar.

11. A system configured for warning about the absence of belaying of a climber equipped with a harness, the system comprising:
 a belaying system; and
 a device as claimed in claim 1, the link being mounted on the belaying system, the link being configured to be held by the belaying system with the final positive incline with respect to the horizontal reference plane.

12. An assembly configured for warning about the absence of belaying of a climber, comprising:
 a harness, configured to be fitted to the climber; and
 a device as claimed in claim 1, the link being attached to the harness, the enclosure being fastened to the harness.

13. A method for warning about the absence of belaying of a climber equipped with a harness to which a link is attached, the link being held by a belaying system with a final positive incline with respect to a horizontal reference plane, the method comprising the following steps:
 a) providing an enclosure, fastened to the harness;
 b) arranging a pressure sensor in the enclosure to measure a barometric pressure;
 c) fastening a detector to the link;
 d) configuring the detector so as to:
  detect a movement of the link within a range of positive inclines with respect to the horizontal reference plane, the final positive incline being contained within the range of positive inclines; and
  output a detection signal comprising:
   a first state, indicating that the link is within the range of positive inclines, and
   a second state, indicating that the link is outside the range of positive inclines;
 e) arranging a microprocessor in the enclosure, said microprocessor being connected to the pressure sensor and to the detector; and
 f) configuring the microprocessor so as to:
  compute a variation in the barometric pressure measured by the pressure sensor, and
  send a warning signal if and only if the variation in the barometric pressure exceeds a predetermined threshold and the detection signal is in the second state.

\* \* \* \* \*